(12) United States Patent
Hayashi et al.

(10) Patent No.: US 6,408,899 B2
(45) Date of Patent: Jun. 25, 2002

(54) APPARATUS FOR ENCRUSTING A FILLING MATERIAL

(75) Inventors: Torahiko Hayashi; Yasunori Tashiro, both of Utsunomiya (JP)

(73) Assignee: Rheon Automatic Machinery Co., Ltd., Tochigi-ken (JP)

( * ) Notice: Subject to any disclaimer, the term of this patent is extended or adjusted under 35 U.S.C. 154(b) by 0 days.

(21) Appl. No.: 09/878,407

(22) Filed: Jun. 12, 2001

(30) Foreign Application Priority Data

Jun. 15, 2000 (JP) ........................................ 2000-179867

(51) Int. Cl.$^7$ ............................... B67C 3/26; B67C 3/34
(52) U.S. Cl. ........................ 141/256; 141/105; 141/107; 141/234; 141/255; 99/450.1
(58) Field of Search ................................. 141/129, 250, 141/252, 255, 256, 234, 100, 103, 105, 107; 99/450.1

(56) References Cited

U.S. PATENT DOCUMENTS

| | | |
|---|---|---|
| 3,513,477 A | 5/1970 | Hayashi ...................... 418/208 |
| 3,615,147 A | 10/1971 | Hayashi .......................... 107/1 |
| 3,682,086 A * | 8/1972 | Ocker .......................... 99/485 |
| 5,882,711 A * | 3/1999 | Onoguchi et al. ....... 425/133.1 |

FOREIGN PATENT DOCUMENTS

| | | |
|---|---|---|
| EP | 0 287 209 | 10/1988 |
| FR | 2645915 | 10/1990 |

* cited by examiner

*Primary Examiner*—Timothy L. Maust
(74) *Attorney, Agent, or Firm*—Finnegan, Henderson, Farabow, Garrett & Dunner LLP

(57) ABSTRACT

An apparatus for encrusting a filling material is provided. The apparatus includes a screw-transferring apparatus to transfer a filling material and encrusting material, and vane pumps to transfer the respective filling and encrusting materials to a combining nozzle. The combining nozzle combines the crust that is supplied by the vane pump for crusts out of the filling material that is supplied by the vane pump for filling materials. Each screw-transferring apparatus includes horizontal screws. Each vane pump has a vertical rotating shaft. The end of each screw is free and is positioned at the inlet of each vane pump. At the inlet of each vane pump a food-guide plane is formed. That plane is tangent to a trajectory of the outer edge of the vane of the vane pump. The trajectory forms a circle that has the biggest diameter among all of the trajectories defined by the outer edges of the vanes when the vanes rotate.

6 Claims, 3 Drawing Sheets

APPARATUS FOR ENCRUSTING A FILLING MATERIAL

FIELD OF THE INVENTION

This invention relates to an apparatus for encrusting a filling material. Particularly, it relates to an apparatus that includes a screw apparatus that transfers a filling material to be encrusted by a crust, and a vane pump that supplies the filling material, which is transferred by the screw apparatus, to a nozzle for combining the filling material and a crust. The apparatus also includes another screw apparatus, which transfers encrusting material to encrust a filing material, and another vane pump, which supplies the encrusting material, which is transferred by the screw apparatus, to the nozzle for combining the filling material and the encrusting material. More particularly, it relates to an apparatus that can prevent the filling and encrusting materials from being kneaded when they are transferred from the screw apparatuses to the vane pumps. Also, the apparatus can supply sufficient filling and encrusting materials to the related vane pumps to fill the spaces between the pairs of the opposed vanes of the vane pumps with sufficient amounts of those materials.

PRIOR ART

Conventional filling apparatuses have a screw-transferring apparatus to transfer a filling material that is supplied from a hopper for filling materials. They also have another screw-transferring apparatus to transfer an encrusting material that is supplied from another hopper for encrusting materials. Also, those filling apparatuses have vane pumps to measure the volumes of the filling and encrusting materials that are transferred from the screw apparatuses and then to transfer them to a combining nozzle.

The filling apparatuses discussed above include various kinds of apparatuses in which the rotating shafts of the screw-transferring apparatuses and the vane pumps are positioned parallel to or aligned with each other. Also, the filling apparatuses include a kind of apparatus that has a screw-transferring apparatus having a pair of screws.

For the apparatuses in which the rotating shafts of the screw-transferring apparatuses and the vane pumps are positioned in parallel, those shafts are shifted up and down and positioned horizontally and in parallel. For the apparatuses in which the shafts of the screw-transferring apparatuses and the vane pumps are aligned with each other, those shafts are not shifted up and down, but the direction of the flow of a material is changed before the material is transferred to the vane pump.

Those conventional filling apparatuses have a limitation when they are made smaller. Also, the apparatuses in which the direction of the flow of a material is changed have a problem wherein they are intended to knead the material. Also, the conventional filling apparatuses sometimes cannot fill the spaces between a plurality of pairs of vanes of the vane pumps with sufficient food materials. There remain disadvantages to be overcome so as to continuously feed a uniform amount of a food material to a combining nozzle, because there are many cases where the spaces between pairs of vanes that are located in a vane pump cannot be filled with a food material.

SUMMARY OF INVENTION

This invention is to overcome the above-mentioned problems by the prior-art apparatuses. The object of this invention is to provide an apparatus for encrusting a filling material. It includes a screw-transferring apparatus for filling materials to transfer a filling material supplied by a hopper for filling materials, a vane pump for filling materials to transfer a filling material that is fed by the screw-transferring apparatus to a combining nozzle, a screw-transferring apparatus for crusts to transfer a crust that is supplied by a hopper for crusts, and a vane pump for crusts to transfer a crust that is fed by the screw-transferring apparatus for crusts to said combining nozzle. The combining nozzle combines the crust that is supplied by the vane pump for crusts with the filling material that is supplied by the vane pump for filling materials. The crust surrounds the filling material. This apparatus is characterized in that each screw-transferring apparatus includes horizontal screws, in that each vane pump has a vertical rotating shaft, and in that the end of each screw is not held and is located near the inlet of each vane pump.

At the inlet of each vane pump a guide plane may be formed. The plane is arranged along a line that is tangent to a trajectory of the outer edge of each rotating vane of the vane pump and forms a circle having the biggest diameter among all of the trajectories defined by the outer edges of the vanes.

Each screw-transferring apparatus may have a pair of screws. The rotational axis of each vane pump is deflected toward the combining nozzle from a position in the middle between the pair of screws. Also, the screws, the vane pumps, and the combining nozzle are positioned at substantially the same level, so that food materials are horizontally transferred from the screws to the combining nozzle.

PREFERRED EMBODIMENTS

Figure 3:
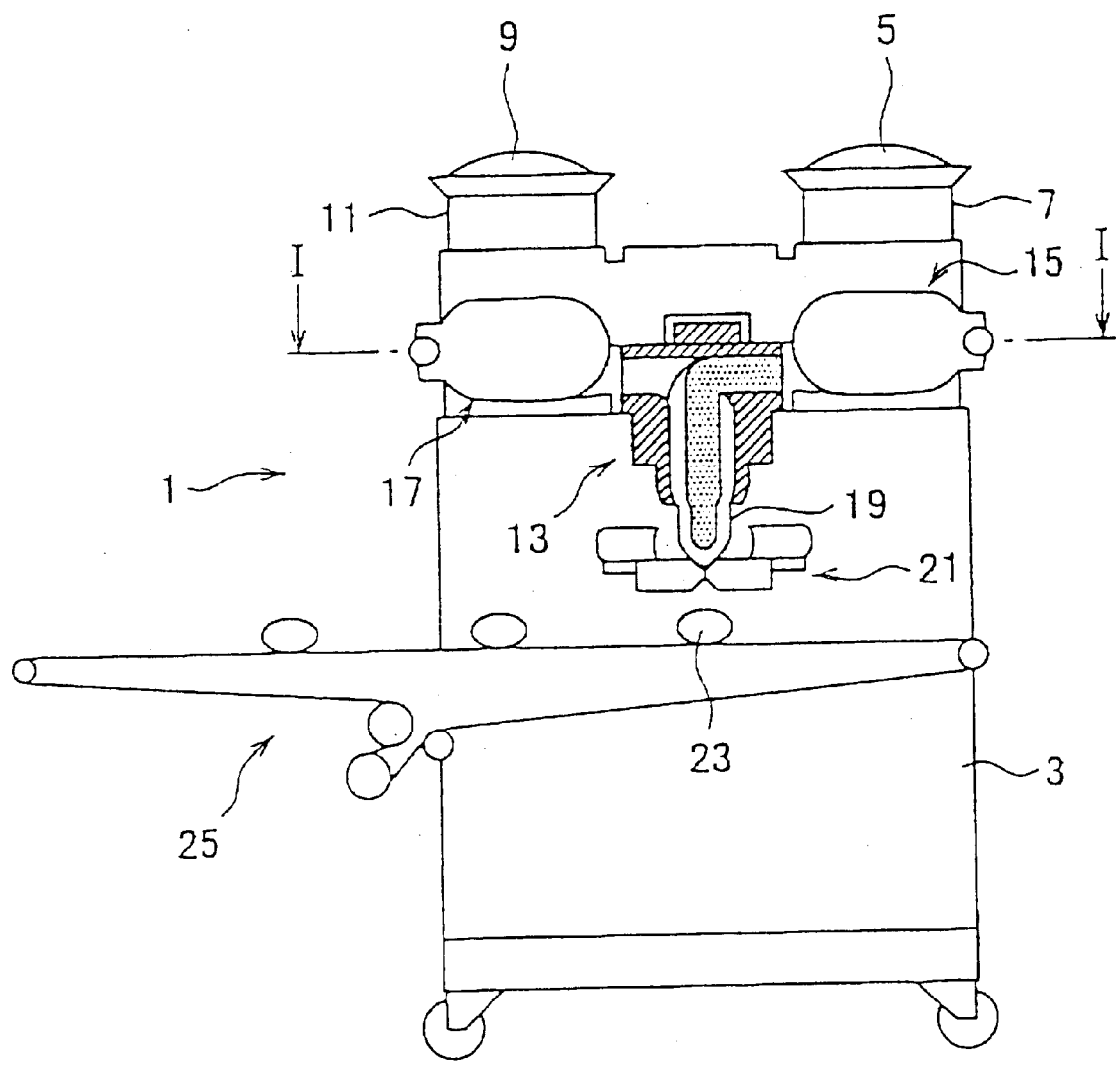
FIG. 3 is a schematic view of the apparatus.

FIG. 3 schematically shows an embodiment of an apparatus for encrusting filling materials 1. At the upper part of this apparatus a hopper 7 for filling materials is located to supply a filling material 5. Also, a hopper 11 for encrusting materials is located to transfer a food crust 9. Below the hopper 7 for filling materials a filling-supplying apparatus 15 is located to supply a filling material to a combining nozzle 13. Below the hopper 11 for encrusting materials is located a crust-supplying apparatus 17 to supply a crust material to the combining nozzle 13. The combining nozzle 13 is located between the filling-supplying apparatus 15 and the crust-supplying apparatus 17.

Below the combining nozzle 13 a crust-cutting apparatus 21 is located to cut a bar-like food material 19. It is formed by combining by means of the combining nozzle 13 an encrusting material with a filling material, which encrusting material surrounds the filling material. Below the crust-cutting apparatus 21 a conveyor apparatus 25 is located. It conveys encrusted food materials 23 that are cut by the crust-cutting apparatus 21 to a subsequent process.

Conventional apparatuses may be used for the crust-cutting apparatus 21 and the conveyor apparatus 25. Thus, no details of them are given on their construction, functions, etc.

Figure 1:
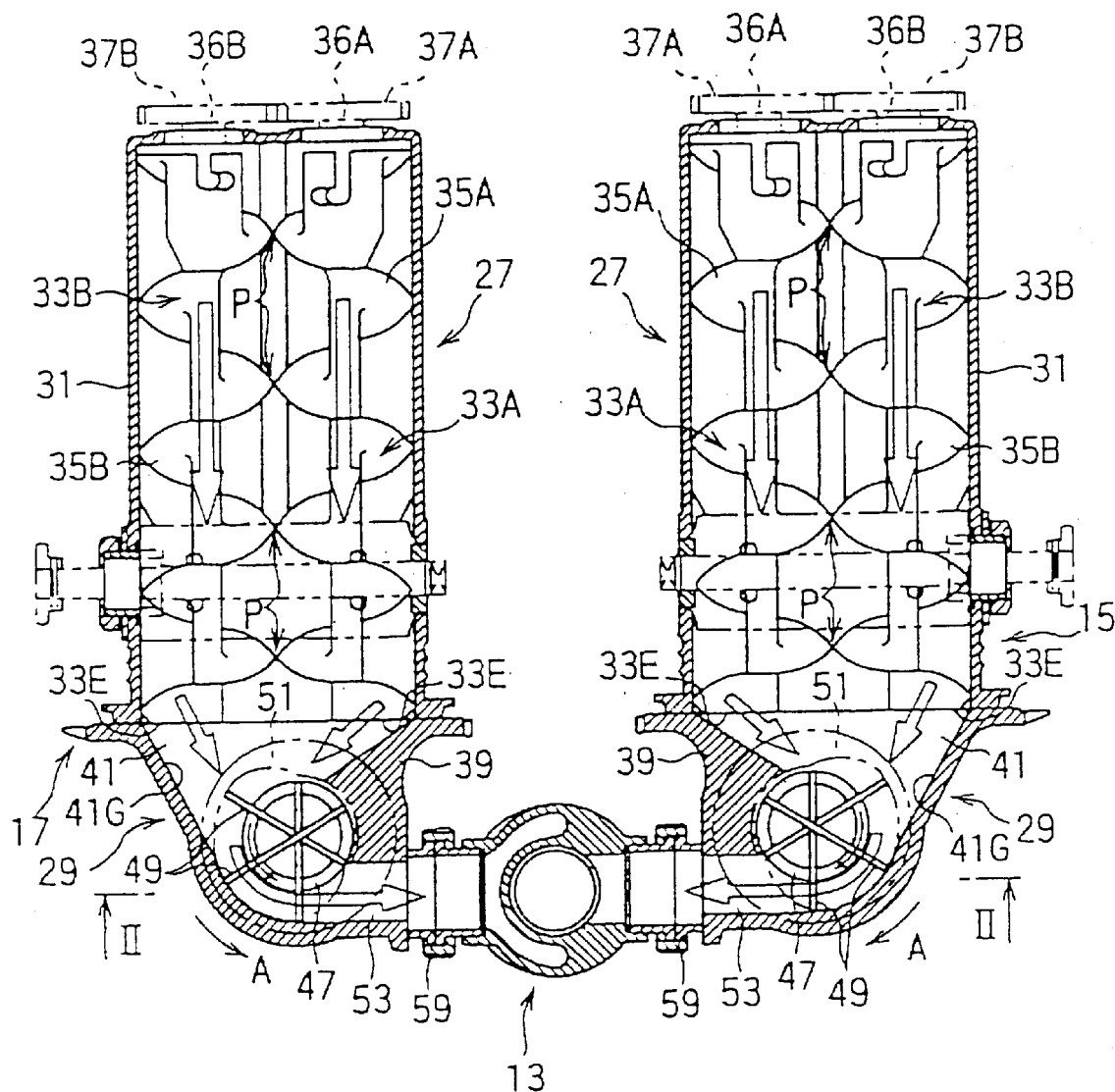
FIG. 1 shows the main part of an embodiment of this invention. It is a sectional view along the line I—I of FIG. 3, which is a schematic view of an apparatus.

As in FIG. 1, the filling-supplying apparatus 15 and the crust-supplying apparatus 17 are symmetrically positioned.

Thus, the same reference numbers are used for their components that perform the same functions. Below only the filling-supplying apparatus 15 is explained. No explanations for the crust-supplying apparatus 17 are given.

The filling-supplying apparatus 15 is comprised of a screw-transferring apparatus 27 to transfer a filling material that is supplied from the hopper 7 (FIG. 3), and a vane pump 29 serving as a metering pump to continuously and constantly supply a filling material to the combining nozzle 13.

The screw-transferring apparatus 27 includes a pair of screws 33A, 33B within a screw-housing 31. The screws are rotatably and horizontally positioned. The screw-housing 31 is formed to have a pair of grooves at the bottom. The bottoms of the grooves are circular. The grooves are arranged in parallel. The screws 33A, 33B are horizontally positioned in the grooves.

The spiral vanes 35A, 35B of the pair of screws 33A, 33B spiral reversely and are fixed at the same pitches (or at the same distances). As the screws 33A, 33B are synchronously and reversely rotated, the contact points of the spiral vanes 35A, 35B or the points that are close to each other on them are gradually moved forward or backward in parallel with the shafts of those spiral vanes. In other words, when synchronously rotating, the screws 33A, 33B act to transfer food materials to the vane pumps 29 without them being kneaded.

Gears 37A, 37B, which have the same diameters, are connected to the rotating shafts 36A, 36B. Those gears mesh with each other. The rotating shafts can be engaged with or disengaged from the base ends of the screws 33A, 33B, so that the screws 33A, 33B can be synchronously and reversely rotated. The gears 37A, 37B are also connected to a control motor (not shown), such as a servomotor, through a rotational transmission mechanism (not shown), such as a gear train, a chain, or a belt.

The screw-transferring apparatuses 27 for filling and encrusting materials are driven and controlled by respective control motors. However, in some cases they may be connected to the same control motor.

While the control motors are being driven, the screws 33A, 33B are synchronously and reversely rotated, so that food materials are transferred to the vane pumps 29. In that case, the points on the vanes 35A, 35B of the screws 33A, 33B that are close to each other are gradually moved toward the vane pumps 29. Thus, the food materials are smoothly transferred. Also, without being kneaded by the spiral vanes 35A, 35B, the food materials are transferred with the good quality being maintained.

Figure 2:
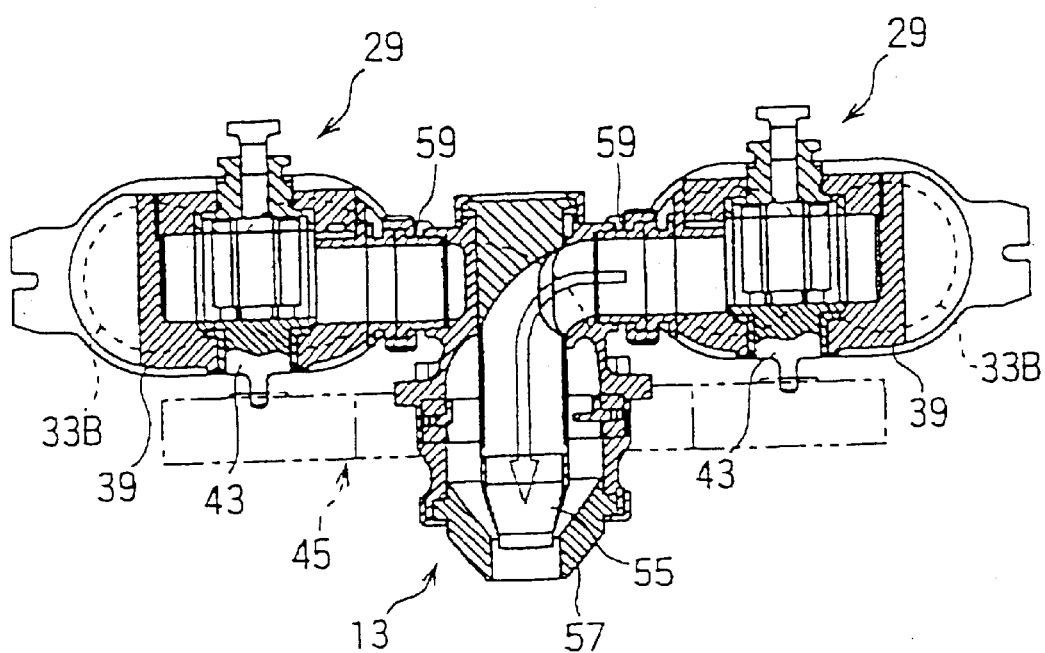
FIG. 2 is a sectional view along the line II—II of FIG. 1.

Each vane pump 29 includes a plurality of vanes that can be radially moved. Each also includes a pump casing 39, which is connected to the end of the screw housing 31. An inlet 41 is formed on the pump casing 39 so as to be broader at the end nearest the screw housing 31. At the other end of the inlet 41, which is narrower than the end nearest the screw housing 31, a vertical rotating shaft 43 is rotatably positioned (FIG. 2). To simultaneously rotate the vane pumps 29 for filling and encrusting materials, their rotating shafts 43 are connected to each other through a transmission device, such as a belt and a gear train. The shafts are also connected to a control motor (not shown). The respective shafts may be rotated by separate motors.

A rotating cylinder 47 (FIG. 1) is connected to the rotating shaft 43. The rotating cylinder 47 is positioned in the pump casing 39 at the same level as at that of the screws 33A, 33B. As in FIG. 1, a plurality of slits are formed on the surface of the rotating cylinder 47. In the slits a plurality of vanes 49 are held so that they can be horizontally and radially moved within the slits. A cam 51, having a certain shape, is located in each pump casing 39 so as to cause all the vanes 49 to radially move as the rotating cylinder 47 rotates. As in FIG. 1, the axis of the rotating cylinder 47 is deflected toward the combining nozzle 13 from a position in the middle between the pair of screws 33A, 33B. Also, the rotating cylinder 47 is positioned at a level that is the same as the pair of screws 33A, 33B. Thus, the distances between each vane pump 29 and the combining nozzle 13 can be shortened. As the rotating cylinder 47 is rotated in the direction of the arrow A, a food material that is fed by the screw-transferring apparatus is transferred through the inlet 41 to the front sides of the vanes, and then moved to the rotating cylinders 47, so that the spaces between the vanes are filled with the food materials. Then, the food materials are constantly fed out to outlets 53 at a constant volume, and then supplied to the combining nozzle 13. If both the length of the rotating cylinder 47 and the width (or height) of each vane increase, the capacity of each vane pump 29 can be easily enlarged. Thus, without changing the sizes of the diameters of the vanes the capacity can be changed, so that the length of the passage where a food material moves in the vane pump can be kept constant.

The spaces between each vanes of each vane pump 29 can be filled with a food material that is transferred by the screw-transferring apparatus 27, without the food material being kneaded. This can be achieved by these following structural features. That is, the feeding ends of the pair of screws of each screw-transferring apparatus 27 are not held. Also, those ends are opposed to the inlets 41. Also, at each inlet 41 a food-guide plane 41G is formed. The plane is tangent to the trajectory of the outer edges of the rotating vanes 49 that extend to the maximum diameter, so that the spaces between the vanes of each vane pump 29 can be smoothly filled with sufficient food material. That is, the metering space is surrounded and defined by the part of the trajectory that is defined by the pair of the vanes 49 that extend to the maximum diameter, the opposed surfaces of those vanes 49 and a part of the casing 39, and a part of the outside of the rotating cylinder 47.

By those structural features the food material can be transferred by the screws 33A, 33B of each screw-transferring apparatus 27 to each inlet 41 without any impedance, because the shafts of the screws 33A, 33B are not held at each inlet 41 and do not need any bearings. Then, the food material is fed along the food-guide plane 41G through the outer edges of the vanes to the rotating cylinder 47. Then, the spaces between the vanes are automatically filled with the food material. Thus, when the food material is transferred from the screw-transferring apparatus 27 to each vane pump 29, it is not kneaded.

As stated above, the food-guide plane 41G is formed to be tangent to the trajectory of the outer edge of the vane 49 that extends to the maximum diameter. The metering spaces between the vanes can be continuously filled with sufficient food material just before they are dosed. As soon as they are dosed, they are opened toward the outlet 53 and discharge the food material at a constant volume. Thus, the passage where the food material is transferred in each vane pump 29 is made to be short, so that the food material is prevented from being kneaded in each vane pump 29.

If control apparatuses are used to separately control the control motors of the screw-transferring apparatus 27 and each vane pump 29 so as to control the ratio of the number of times they rotate, the spaces between the vanes 49 of each vane pump 29 can be filled with sufficient food material.

Thus, the food material can be continuously discharged from each vane pump 29 at a constant volume. That is, the ratio of the number of revolutions of the control motor of the screw-transferring apparatus 27 to the number of revolutions of the control motor of the vane pump can be conveniently controlled. Also, the speeds of those control motors can be controlled. Thus, the inlet 41 of the vane pump does not cause any large pressure to be generated in the food material. The metering spaces can be filled with a sufficient amount of that material. The effect on the production can be improved.

The combining nozzle 13 has a dual-nozzle configuration. That is, it includes a filling-discharging nozzle 55 to discharge a filing material and a crust-discharging nozzle 57 that surrounds it. They are both connected to vane pumps 29 through connecting pipes 59. Each connecting pipe 59 is formed to be thicker and shorter than a conventional one so that the food material is prevented from being damaged when it passes through the pipe.

When the food materials are supplied to the hopper 7 for filling materials and the hopper 11 for encrusting materials, and when the screw-transferring apparatuses are driven, a filling material and a crust material are horizontally transferred by the screws 33A, 33B of the screw-transferring apparatuses toward the vane pumps 29 without the food materials being kneaded. Then, the food materials are fed out at the same time from the transit ends 33E toward the inlet 41 of each vane pump 29. When the food materials are transferred, they are not kneaded near the inlet 41, but are directly transferred to the spaces defined by pairs of vanes.

As stated above, each inlet 41 has the food-guide plane 41G and is formed to be wide. Thus, the passage of the food material from the inlet to the vanes 49 is also made to be wide, so that the food material can be smoothly guided. Also, the spaces between the vanes 49 can be filled with sufficient food material when the vanes 49 rotate. Also, the food materials can be continuously fed out from the vane pumps 29 at a constant volume. The food materials that are discharged from the vane pumps 29 are combined by the combining nozzle into a product that has two sections. Then, the combination is cut by a cutting apparatus 21 into products 23 with crusts covering the filling materials. The products 23 are fed by a conveying apparatus 25 to a subsequent step.

As stated above, the screws 33A, 33B of the screw-transferring apparatuses 27, the vane pumps 29, and the combining nozzle 13 are positioned at the same level. Thus, even if large vanes 49 are used for the vane pumps 29, the length of the vanes in the direction of the diameter can be kept constant. Thus, the depths of the metering spaces in the direction of the diameter vary little, so that the metering spaces can be rapidly filled with the food materials and so that they are not filled insufficiently with food materials.

As stated above, the screws 33A, 33B, the vane pumps 29, and the combining nozzle 13 are positioned at the same level. Thus, the length in each vane pump 29 of the passage where the food material is transferred is made to be short. Also, the lengths of the connecting parts between the vane pumps 29 and the combining nozzle 13 are made to be short by deflecting the position of the rotating axis of each vane pump toward the combining nozzle. Also, those connecting parts are made to be thick. Thus, the length of the passage where the food material passes is made to be short. Also, the food material is prevented from being kneaded until it reaches the combining nozzle 13.

According to this invention, when the food materials are transferred from the screw-transferring apparatuses having the screws to the vane pumps, the food materials can be smoothly moved from the screw-transferring apparatus to the vane pumps and are not prevented from being kneaded. Also, the good quality of the food materials is maintained. The metering spaces are filled with sufficient food material. Thus, the disadvantages of the prior-art apparatuses can be overcome by this invention.

Because the screws of the screw-transferring apparatuses and the combining nozzle are positioned at the same level, the height of the apparatuses can be decreased. Also, when the capacity of each vane pump increases the respective vanes do not need to be longer, but do need to be wider (or higher). Thus, in that case the depth of each metering space can be kept constant, so that the metering spaces can be rapidly and smoothly filled with the food materials without an insufficient amount of food material being filled.

What is claimed is:

1. An apparatus for encrusting a filling material comprising a screw-transferring apparatus for filling materials to transfer a filling material supplied by a hopper for filling materials, a vane pump for filling materials to transfer a filling material that is fed by the screw-transferring apparatus to a combining nozzle, a screw-transferring apparatus for encrusting materials to transfer an encrusting material that is supplied by a hopper for crusts, and a vane pump for crusts to transfer a crust that is fed by the screw-transferring apparatus for crusts to said combining nozzle, the combining nozzle combining the encrusting material that is supplied by the vane pump for crusts with the filling material that is supplied by the vane pump for fling materials, which filling material is surrounded by the encrusting material, characterized in that each screw-transferring apparatus includes horizontal screws, in that each vane pump has a vertical rotating shaft, and in that the end of each screw is not held and is positioned at the inlet of either vane pump.

2. The apparatus of claim 1 wherein at the inlet of each vane pump a food-guide plane is formed, said plane being tangent to a trajectory of the outer edge of the vane of the vane pump and forming a circle having the biggest diameter among all of the trajectories defined by the outer edges of the vanes when the vanes rotate.

3. The apparatus of claim 2 wherein said plane is arranged to form a passage for a food material to be gradually narrowed toward the inside of the vane pump.

4. The apparatus of claim 1 wherein each screw-transferring apparatus has a pair of screws, wherein the rotational axis of the vane pump is deflected toward the combining nozzle from a position in the middle between the pairs of screws, and wherein the screws, the vane pumps, and the combining nozzle are positioned at substantially the same level, so that the food materials are horizontally transferred from the screws to the combining nozzle.

5. The apparatus of claim 1 wherein each vane pump includes a plurality of vanes and a rotating cylinder, on which rotating cylinder a plurality of slits are formed so that the vanes are caused to slide in the slits as the rotating cylinder rotates.

6. The apparatus of claim 1 wherein said combining nozzle has two nozzles, one of them being positioned in the center and the other surrounding it.

* * * * *

UNITED STATES PATENT AND TRADEMARK OFFICE
CERTIFICATE OF CORRECTION

PATENT NO. : 6,408,899 B2
DATED : June 25, 2002
INVENTOR(S) : Torahiko Hayashi et al.

It is certified that error appears in the above-identified patent and that said Letters Patent is hereby corrected as shown below:

<u>Column 6,</u>
Line 33, "fling", should read -- filling --.

Signed and Sealed this

Seventeenth Day of September, 2002

*Attest:*

JAMES E. ROGAN
*Attesting Officer*     *Director of the United States Patent and Trademark Office*